US010667035B2

(12) United States Patent
Hentunen et al.

(10) Patent No.: US 10,667,035 B2
(45) Date of Patent: May 26, 2020

(54) APPARATUSES AND METHODS FOR ACOUSTIC NOISE CANCELLING

(71) Applicant: Sony Corporation, Tokyo (JP)

(72) Inventors: Daavid Hentunen, Stuttgart (DE);
Fabien Cardinaux, Stuttgart (DE);
Hugo Magalhaes, Stuttgart (DE)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/361,251

(22) Filed: Mar. 22, 2019

(65) Prior Publication Data

US 2019/0297412 A1    Sep. 26, 2019

(30) Foreign Application Priority Data

Mar. 26, 2018    (EP) ..................................... 18164050

(51) Int. Cl.
| | | |
|---|---|---|
| *A61F 11/06* | (2006.01) | |
| *G10K 11/16* | (2006.01) | |
| *H03B 29/00* | (2006.01) | |
| *H04R 1/22* | (2006.01) | |
| *G10K 11/35* | (2006.01) | |
| *H04R 1/02* | (2006.01) | |
| *H04R 27/00* | (2006.01) | |

(Continued)

(52) U.S. Cl.
CPC .............. *H04R 1/22* (2013.01); *G10K 11/175* (2013.01); *G10K 11/35* (2013.01); *H04R 1/028* (2013.01); *H04R 27/00* (2013.01); *B64C 2201/12* (2013.01); *G10K 11/17857* (2018.01); *G10K 2210/128* (2013.01)

(58) Field of Classification Search
CPC .......... H04R 1/22; H04R 1/028; H04R 27/00; G10K 11/175; G10K 11/35
See application file for complete search history.

(56) References Cited

U.S. PATENT DOCUMENTS

| 7,088,828 B1 | 8/2006 | Bradford et al. |
| 8,229,130 B2 | 7/2012 | Paradiso et al. |

(Continued)

FOREIGN PATENT DOCUMENTS

| CN | 103236899 A | 8/2013 |
| CN | 103236899 B | 10/2015 |

(Continued)

OTHER PUBLICATIONS

Extended European Search Report dated Oct. 29, 2019 in European Application No. 19156707.2-1207.

(Continued)

*Primary Examiner* — Simon King
(74) *Attorney, Agent, or Firm* — Xsensus LLP

(57) ABSTRACT

The present disclosure relates to concepts of acoustic noise cancelling. A noise cancelling apparatus contains a propulsion component configured to autonomously move the noise cancelling apparatus, and circuitry. The circuitry is configured to determine a position of an acoustic source, to determine a position of an acoustic receiver, and, depending on the detected positions of the acoustic source and the acoustic receiver, to control the propulsion component to navigate the noise cancelling apparatus to a target position to at least partly cancel an acoustic signal from the acoustic source at the position of the acoustic receiver.

20 Claims, 3 Drawing Sheets

(51) Int. Cl.
*G10K 11/175* (2006.01)
*G10K 11/178* (2006.01)

(56) References Cited

U.S. PATENT DOCUMENTS

| | | | |
|---|---|---|---|
| 8,972,251 | B2 | 3/2015 | Xiang et al. |
| 9,646,597 | B1* | 5/2017 | Beckman .............. B64C 39/024 |
| 2006/0109983 | A1 | 5/2006 | Young et al. |
| 2016/0063987 | A1 | 3/2016 | Xu et al. |
| 2016/0241720 | A1 | 8/2016 | Cheatham, III et al. |

FOREIGN PATENT DOCUMENTS

| | | |
|---|---|---|
| WO | 2008/133490 A2 | 11/2008 |
| WO | 2011/151842 A1 | 12/2011 |
| WO | 2017/003472 A1 | 1/2017 |

OTHER PUBLICATIONS

Partial European Search Report dated Jul. 25, 2019 in European Application No. 19156707.2-1207.

\* cited by examiner

APPARATUSES AND METHODS FOR ACOUSTIC NOISE CANCELLING

CROSS-REFERENCE TO RELATED APPLICATION

The present application claims priority to European Patent Application 18164050.9 filed by the European Patent Office on Mar. 26, 2018, the entire contents of which being incorporated herein by reference.

FIELD

The present disclosure relates to concepts for acoustic noise cancelling and, more particularly, to noise cancelling apparatuses and noise cancelling methods.

BACKGROUND

In environments like working environments or private environments it is desired in some situations to prevent that a communication reaches a third listener. A communication can be a confidential conversation of two persons or of a person having a phone call. The third listener can be a third person, e.g. an eavesdropper, or a device able to record or transmit the communication. In some environments it may be desired to prevent an acoustic signal to reach a person. The acoustic signal could be a noise of a machine or a sound emission of a loudspeaker. The person might desire a certain degree of quietness instead of hearing the acoustic signal.

There are concepts for attenuating an acoustic signal. A concept for attenuating an acoustic signal can be called noise cancelling. By using a noise cancelling method, the acoustic signal may be cancelled at least to a certain degree such that a loudness or sound level of the acoustic signal may be attenuated at least at a predefined position.

Noise cancelling devices may be configured to attenuate an acoustic signal by superimposing a countersignal with the acoustic signal. Devices like noise cancelling headphones may attenuate an acoustic signal arriving at a user wearing the noise cancelling headphones such that the user does not hear the acoustic signal anymore. For example, a sound level of the acoustic signal perceived by the user wearing the noise cancelling headphones is lower than a sound level perceived by the user without the noise cancelling headphones. Here, the predefined position may be a user's ear. In another example, a suppression speaker may be provided in a mobile phone, the suppression speaker outputting a countersignal of a speaking signal of a user of the mobile device. Due to superimposing the countersignal with the speaking signal, the speaking signal may be attenuated within a suppression zone. Here, the predefined position may be a position within the suppression zone.

Concepts for attenuating an acoustic signal may show a lack of comfort as a user wearing noise cancelling headphones on her head may feel uncomfortable. Concepts for attenuating an acoustic signal may be ineffective as an acoustic signal of a conversation may reach to a third listener despite a suppression speaker, e.g. if the third listener is not located within the suppression zone. There may be a demand for improved concepts for noise cancelling.

SUMMARY

This need is met by apparatuses and methods in accordance with the independent claims. Advantageous embodiments are addressed by the dependent claims.

An example relates to a noise cancelling apparatus. The noise cancelling apparatus comprises a propulsion component configured to autonomously move the noise cancelling apparatus. The noise cancelling apparatus also comprises circuitry configured to detect a position of an acoustic source and a position of an acoustic receiver. Depending on the detected positions of the acoustic source and the acoustic receiver, the circuitry is further configured to control the propulsion component to navigate the noise cancelling apparatus to a target position to at least partly cancel an acoustic signal from the acoustic source at the position of the acoustic receiver.

An example relates to a noise cancelling method. The noise cancelling method comprises detecting a position of an acoustic source and detecting a position of an acoustic receiver. Depending on the detected positions of the acoustic source and the acoustic receiver, the method comprises controlling a propulsion component of the noise cancelling apparatus to navigate the noise cancelling apparatus to a target position to at least partly cancel an acoustic signal from the acoustic source at the position of the acoustic receiver.

BRIEF DESCRIPTION OF THE FIGURES

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

Unless otherwise defined, all terms (including technical and scientific terms) are used herein in their ordinary meaning of the art to which the examples belong.

Presented concepts for noise cancelling may help to provide privacy for at least a user of a presented noise cancelling apparatus. Examples may provide privacy for the user in an environment where there may be e.g. either (hostile) eavesdroppers or alternatively unwanted noise producing sources around the user. This may be achieved by introducing an autonomously moving noise cancelling apparatus which is able to reposition itself advantageously in order to e.g. produce noise cancelling signals that may prevent eavesdroppers from listening to the user's conversations or, alternatively, prevent the user from hearing unwanted noise.

The presented noise cancelling apparatus may in one embodiment provide noise cancelling by preventing sound emitted by the user to reach a third person, or in the other direction to prevent sound emitted from an external sound source to reach the user. In an embodiment it is possible to define whether the noise is cancelled at a position of the user or at a position away from the user. In another embodiment it is possible to cancel the noise at a position of the user or at a position away from the user.

Figure 1:
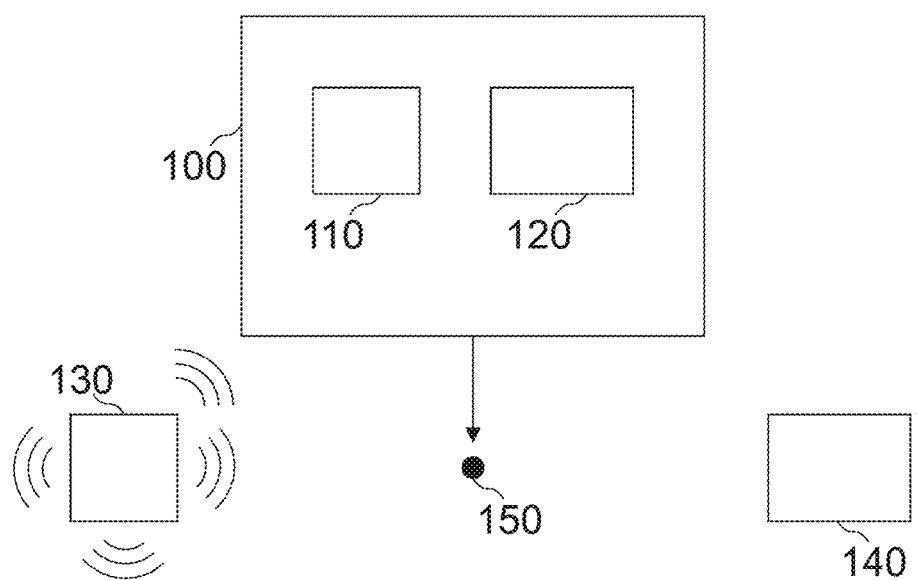
FIG. 1 shows a schematic illustration of a noise cancelling apparatus comprising a propulsion component.

FIG. 1 shows a schematic illustration of a noise cancelling apparatus 100. The noise cancelling apparatus 100 comprises at least one propulsion component 110 and circuitry 120. The propulsion component 110 is configured to autonomously move the noise cancelling apparatus 100. The circuitry 120 is configured to determine a position of an acoustic source 130 and to determine a position of an acoustic receiver 140. Depending on the determined positions of the acoustic source and the acoustic receiver, the circuitry 120 is further configured to control the propulsion component to navigate the noise cancelling apparatus to a target position 150. The circuitry determines the target position depending on the determined positions of the acoustic source and the acoustic receiver. At the target position, the noise cancelling apparatus 100 at least partly cancels an acoustic signal from the acoustic source at the position of the acoustic receiver 140. The target position 150 may be a position from where effective noise cancelling can be provided by the noise cancelling apparatus.

According to an embodiment, an assigned user of the apparatus is either the acoustic source, or the acoustic receiver. According to another embodiment, the noise cancelling apparatus is configured to provide different operation modes and enables a flexible approach where e.g. a user can define whether he is the acoustic source or the acoustic receiver. Alternatively, the apparatus could be assigned to a specific location, e.g. a privacy spot set by a user, a phone booth etc., and the position of either the acoustic source or the acoustic receiver might be fixed to correspond to the specific location. For example, at the specific location, the user could be the acoustic source, and outside the specific location, the same user could be the acoustic receiver. In some embodiments, the noise cancelling apparatus may e.g. obtain the position of the specific location by user input or by an position information signal from an external device (e.g. as GPS coordinates or similar), or it might be positioned at the specific location, so that it can determine and memorize that position absolutely or in relation to its current position, using information obtained from one or more sensors.

The circuitry 120 may comprise an electrical circuit or a processor. The noise cancelling apparatus 100 may in an embodiment be equipped with a detection circuitry for determining or detecting an acoustic source position. The detection circuitry may comprise one or more sensors and, for example, be a camera or a microphone and can be part of the circuitry 120. The acoustic source may be a human speaker having a conversation or a phone call at an acoustic source position, e.g. a first position. The human speaker may be a user of the noise cancelling apparatus 100 who wishes to prevent the conversation to be heard by a third person. A third person may be someone listening to the conversation directly due to a close spatial distance to the user, or by listening via a mobile device with a microphone. A mobile device might record and/or transmit the conversation. The third person or said mobile device may be an acoustic receiver at an acoustic receiver position, e.g. a second position. The noise cancelling apparatus 100 is configured to determine or detect the acoustic receiver position. In one embodiment, the acoustic receiver position is determined by using one or more sensors, e.g. using a camera of the circuitry 120 to detect the listener. Alternatively, the acoustic receiver position and/or the acoustic source position may be determined based on position information received from one or more external devices (for example, a mobile or wearable device of the user); in that case, the noise cancelling apparatus 100 may comprise suitable receiving circuitry.

After determination of the acoustic receiver position, the circuitry may determine a target position based on the position of the acoustic receiver. In one embodiment, determining the target position may additionally be based on the position of the acoustic source. Optionally, environmental information, like camera pictures showing obstacles around the noise cancelling apparatus, which may e. g. be obtained by sensors of the noise cancelling apparatus, may also be used in determining the target position.

How the target position is determined may depend on a noise cancelling technique employed by the noise cancelling apparatus. In an embodiment, an acoustic countersignal may mask the acoustic signal, and the target position might be determined to be as close as possible to the position of the acoustic receiver while e.g. keeping a certain safety distance (e.g. more than 1, 2 or 3 meters) to avoid invading a personal space around the acoustic receiver. An appropriate distance may depend on the type and/or size of the noise cancelling apparatus. For such embodiments, there might be no need to determine the position of the acoustic source. According to an embodiment, an acoustic countersignal may cancel or eliminate the acoustic signal, and the noise cancelling apparatus may determine the target position to be between the acoustic source and the acoustic receiver. Ideally, the target position would be (roughly) located on a theoretical straight line, or line of sight, between the acoustic source and the acoustic receiver. However, the target position may also be determined to be in an area between the acoustic source and the acoustic receiver, for example when there are obstacles on the line of sight etc. For example, the target position may have an equal distance to the acoustic source and the acoustic receiver, or a distance from the target position to the acoustic source may be smaller than a distance from the acoustic receiver to the acoustic source. For example, the target position may be within 2 m distance from the acoustic source position in a direction to the acoustic receiver position. Alternatively, the target position could be between the acoustic source and the acoustic receiver, wherein the target position is located closer to the acoustic receiver than to the acoustic source. In an exemplary situation, one acoustic receiver may cease to exist and another appears on the opposite side of the acoustic source. In this case, the noise cancelling apparatus would have to move a longer distance if it was closer to the original acoustic receiver compared to if it was closer to the acoustic source, so the target position may be determined closer to the acoustic source than to the acoustic receiver.

A reason for having one kind of noise cancelling apparatus closer to the acoustic receiver may be to obtain a feedback signal about the actual sound or acoustic signal from the acoustic source at the noise cancelling apparatus or the position of the acoustic receiver. For example, a microphone (e.g. additionally to the noise cancelling apparatus, e.g. in a moving device comprising a propulsion component) can be positioned between the noise cancelling apparatus (or the target position, respectively) and the position of the acoustic receiver to generate the feedback signal. The microphone may be positioned at a place to hear the same sound as the acoustic receiver. If this microphone e.g. receives sound from the acoustic source that is supposed to be noise cancelled, but for some reason is not, then the feedback signal may be sent back to the noise cancelling apparatus, e.g. from the microphone. Feedback signals can be the actual audio recording (or acoustic signal) that was heard and the noise cancelling apparatus can then try to adjust its cancelling attempt in order to better cancel the sound heard by acoustic receiver. One purpose of the feedback signal may be to ensure that the noise cancelling works as expected. For example, the noise cancelling apparatus may emit a signal, e.g. a visual signal (blinking light), if noise cancelling cannot be performed as expected. The microphone itself can be physically right next to the noise cancelling apparatus and/or be a part of the noise cancelling apparatus (e.g. the microphone could be attached to the noise cancelling apparatus by fastening elements, e.g. a pole, and the noise cancelling apparatus may be configured to rotate to position the microphone). Feedback signals can be used to tune a countersignal's or cancelling signal's content and/or direction.

The target position is a position where it may be possible for the noise cancelling apparatus to cancel, mask or attenuate the signal from the acoustic source at the position of the acoustic receiver. From the target position, noise cancelling provided by the noise cancelling apparatus may be improved compared to noise cancelling from other positions. In an embodiment, the target position may be closer than 5 m (or closer than 3 m, or closer than 1 m) from the position of the acoustic receiver. A closer distance may improve an attenuation achieved by the noise cancelling apparatus at the position of the acoustic receiver.

The noise cancelling apparatus 100 has a propulsion component 110 like an electrical drive, an actuator or a combustion engine. The propulsion component may be configured to drive a moving mechanism of the noise cancelling apparatus 100, e.g. wheels and/or propellers. By using the propulsion component 110, the noise cancelling apparatus can autonomously change its position. The noise cancelling apparatus may be configured to move horizontally and/or vertically. For example, horizontal change of the position of the noise cancelling apparatus may be achieved by driving the noise cancelling apparatus on wheels on a floor, while vertical change of the position of the noise cancelling apparatus may be achieved by elevating the noise cancelling apparatus using a lift arm. The circuitry 120 can control the propulsion component 110 in order to navigate the noise cancelling apparatus to the target position. The noise cancelling apparatus can autonomously change its position in order to be able to cancel or attenuate the signal from the acoustic source at the position of the acoustic receiver.

The noise cancelling apparatus may be mobile or a mobile noise cancelling apparatus. A mobile apparatus may be independent from a connection wire like a power connection wire. For example, the largest side length of the noise cancelling apparatus is smaller than 1 m, smaller than 50 cm, smaller than 20 cm, smaller than 10 cm, or smaller than 5 cm. The noise cancelling apparatus may comprise at least a battery or a rechargeable battery for powering the propulsion component. The noise cancelling apparatus may show a high degree of freedom to move so that the noise cancelling apparatus may provide privacy for the user also if the user e.g. walks around while having the conversation.

For example, the user while having the conversation walks from the first position to a third position, and the third person remains at the second position. Depending on the changed position, the circuitry of the noise cancelling apparatus may determine a new target position and control the propulsion component accordingly to navigate the noise cancelling apparatus to the new target position. The respective positions may be determined or detected continuously, or in certain intervals, and the target position may be adapted dynamically when changes of the acoustic source position and/or the acoustic receiver position are detected. By changing the target position, the noise cancelling apparatus may still enable effective noise cancelling of the acoustic signal from the third position at the second position. By contrast it may be possible that a noise cancelling would be ineffective in case the acoustic source position changes while the noise cancelling apparatus remains at a same position. Thus, noise cancelling may be improved by using the noise cancelling apparatus.

In another example, the third person may move, and the position of the acoustic receiver changes from the second position to a fourth position. At the same time, the user may continue to change its position. The circuitry of the autonomously repositioning noise cancelling apparatus 100 continuously determines new appropriate target positions and controls the propulsion component accordingly to continuously change the position of the noise cancelling apparatus with respect to both the position of the acoustic source and the acoustic receiver. The noise cancelling apparatus may continuously enable effective noise cancelling at the position of the acoustic receiver while the acoustic source position and/or the acoustic receiver position changes.

In some cases, the target position may not be reachable, e.g. if an obstacle is located at the target position. In an embodiment, an environmental sensor of the noise cancelling apparatus can detect the obstacle and indicate that another target position must be used. An environmental sensor could be a camera, an ultra sound sensor, and/or a laser sensor. If a first determined target position cannot be reached, a new or alternative target position could be determined, e.g. a second best target position for enabling noise cancelling.

In another example, the acoustic source may be at a fixed position. The acoustic source may be a loudspeaker emitting acoustic signals. The position of the user of the noise cancelling apparatus may be the position of the acoustic receiver, wherein the user would hear the emitted acoustic signals from the loudspeaker without noise cancelling. The noise cancelling apparatus may position itself at the determined target position, e.g. between the loudspeaker and the user, and provide noise cancelling at the position of the user. As a consequence, the user may not hear the emitted acoustic signals from the loudspeaker due to the presence of the noise cancelling apparatus. The user may hear the acoustic signal in attenuated form, e.g. the attenuation may be larger than 3 db, larger than 6 db, larger than 12 db or larger than 24 db. Due to the autonomously moving noise cancelling apparatus the user can move independently and without limitations e.g. within a room with the loudspeaker while noise cancelling may remain constant due to the updated target positions.

Using the noise cancelling apparatus may result in cancelling or attenuating a sound or acoustic signal emitted from an acoustic source at the position of the acoustic receiver. In a first operation mode of an embodiment, the noise cancelling apparatus may prevent a conversation of a user to reach an unwanted listener. In another operation mode of the embodiment, the noise cancelling apparatus may prevent noise from acoustic sources like loudspeakers or noisy machines to reach the user. Providing different operation modes, the noise cancelling apparatus has a high flexibility regarding the position where a noise can be cancelled while providing a high comfort of the user. The user of the noise cancelling apparatus can move freely outside any predefined noise cancelling perimeter while the autonomously moving noise cancelling apparatus provides noise cancelling at the user position. The user does not have to manually reposition a noise cancelling device. Compared to other solutions, using the noise cancelling apparatus or a plurality of the noise cancelling apparatuses may have the effect that sound from multiple sources may be protected from eavesdropping instead of only protecting sound from a single position.

According to an example for providing noise cancelling, the circuitry is configured to generate an acoustic countersignal at the target position 150. The acoustic countersignal cancels, at the position of the acoustic receiver 140, the acoustic signal from the acoustic source 130 due to interference at least partly. The noise cancelling device may comprise a microphone and a loudspeaker. The microphone may receive an acoustic signal from the acoustic source 130 and the circuitry may generate a phase-shifted countersignal of the acoustic signal. The countersignal may be 180° phase-shifted compared to the acoustic signal. Phase-shift may be performed according to known concepts or algorithms of noise cancelling as e.g. used in noise cancelling headphones. The circuitry is configured to output the countersignal via the loudspeaker to at least partly cancel or attenuate the acoustic signal from the acoustic source at the position of the acoustic receiver 140 by superimposition of the acoustic signal and the countersignal at least at the position of the acoustic receiver 140. Generating said countersignal may result in a low volume level at the position of the acoustic receiver 140, e.g. the acoustic signal from the acoustic source 130 may be imperceptible for the acoustic receiver 140.

For example, the countersignal is generated with respect to the position of the acoustic source 130, the position of the acoustic receiver 140, and/or the position of the noise cancelling apparatus, e.g. the target position 150. If the position of the noise cancelling apparatus is not on a direct or straight acoustic signal path from the acoustic source to the acoustic receiver, a phase-shift of the countersignal with respect to the acoustic signal may deviate from e.g. 180°. The deviation may be more than 5°, more than 10°, more than 30°, or more than 90°, in order to achieve destructive interference of the acoustic signal and the countersignal at the position of the acoustic receiver. 3D audio effects may be used for cancelling the acoustic signal with the countersignal. Multi-path effects or acoustic reflections at a wall, a floor or a ceiling may be used for superimposing the countersignal with the acoustic signal at the acoustic receiver position. For example, a volume level of the outputted countersignal is set depending on the respective positions, e.g. depending on a respective distance between the positions. A rotation angle of the noise cancelling apparatus may be set according to the positions. The rotation angle may be set to align a microphone of the noise cancelling apparatus to the acoustic source and/or to align a loudspeaker of the noise cancelling apparatus to the acoustic receiver. The noise cancelling apparatus may comprise a loudspeaker array, e.g. a 360° loudspeaker array configured to control an output direction of an outputted countersignal.

In another embodiment, the countersignal is an acoustic signal differing from the acoustic signal from the acoustic source, like a song or a random noise. The countersignal may be outputted into the direction of the acoustic receiver at a high volume level. The volume level of the countersignal may be higher than the volume level of the acoustic signal from the acoustic source. As a consequence, the acoustic signal from the acoustic source may be acoustically covered or masked by the louder countersignal and at least a content of the acoustic signal may be incomprehensible at the acoustic receiver position. The countersignal may make a speech signal from the acoustic source hard to understand at the acoustic receiver. Another way of doing it would be by adding noise to it in order to make it garbled. One reason for doing garbling may be that the target may be in such a position that it would not be able to do cancelling (reducing volume, e.g.) properly. So it could at least partly reach its goal by doing garbling. Generating the described kind of countersignal may be easy and possible with low technical efforts.

According to some examples, the target position 150 is between the position of the acoustic source 130 and the position of the acoustic receiver 140. The target position may be between a first plane comprising the position of the acoustic source and a second plane comprising the position of the acoustic receiver, wherein the planes are perpendicular to an axis reaching from the position of the acoustic source to the position of the acoustic receiver. At a target position between the source and the receiver, a sound cancelling countersignal for providing effective noise cancelling may be easy to generate.

According to some examples, the target position 150 is on a line of sight between the position of the acoustic source 130 and the position of the acoustic receiver 140. For some embodiments of the noise cancelling apparatus having a larger shape, an effect of this may be that additionally to providing acoustic privacy, the noise cancelling apparatus may further increase privacy by blocking an optical path from the acoustic source to the acoustic receiver. The acoustic source may be optically covered by the noise cancelling apparatus from the perspective of the acoustic receiver.

In some examples it can be possible to provide effective noise cancelling although the target position is not between the acoustic source and the acoustic receiver. For example, a distance between the target position 150 and the position of the acoustic source 130 is larger than a distance between the position of the acoustic source 130 and the position of the acoustic receiver 140. At the same time, a distance between the target position 150 and the position of the acoustic receiver 140 is smaller than a distance between the position of the acoustic source 130 and the position of the acoustic receiver 140. Accordingly, the noise cancelling apparatus may position itself behind the acoustic receiver from a point of view of the acoustic source, e.g. because it may be difficult or impossible to position itself between the acoustic receiver and the acoustic source. The noise cancelling apparatus 100 may be configured to receive an electromagnetic signal comprising information about the acoustic signal from the acoustic source, e.g. via a WLAN (wireless local area network) connection or a Bluetooth connection. For example, the user of the noise cancelling apparatus has a conversation via a mobile phone and the acoustic signal is recorded by the phone and electromagnetically transmitted to the noise cancelling apparatus. The noise cancelling apparatus then can generate a countersignal, e.g. phase-shifted depending on corresponding positions as described above, such that destructive interference can be achieved at the position of the acoustic receiver. By transmitting the information of the acoustic signal electromagnetically, attenuation can be provided at the acoustic receiver position although the acoustic receiver is closer to the acoustic source than the noise cancelling apparatus. In some examples a countersignal may be unrelated to an acoustic signal from the acoustic source and there may be no need to receive information about the acoustic signal, e.g. a loud countersignal can acoustically cover the acoustic signal.

According to some examples, the noise cancelling apparatus may be a drone, or part of a drone with additional functionality, and the propulsion component 110 comprises a propeller of a drone configured to move the noise cancelling apparatus 100 in three orthogonal dimensions. In other words, the noise cancelling apparatus may be a drone with circuitry 120. Drones are very flexible with respect to its possibilities of positioning itself, and noise cancelling can be provided in flexible adaptation to a current situation. For example, if the acoustic receiver is another drone, the noise cancelling apparatus may fly to an adequate target position to provide effective noise cancelling at the position of the other drone. In other examples, the noise cancelling apparatus may be another kind of flying device, e.g. a mini-helicopter.

According to some examples, the noise cancelling apparatus may be a robot or robotic device, or part of a robot or robotic device, and the propulsion component 110 comprises a movement device of a robot. The robot may be a wheel robot and the propulsion component may drive the wheels to move the noise cancelling apparatus. The robot may be a leg robot and the propulsion component may drive the legs of the leg robot. In other words, the noise cancelling apparatus may be any robotic device with a moving mechanism for moving on ground and/or water. Providing the noise cancelling apparatus in a robot with additional functionality, like a household robot, may be advantageous for cost reasons. A battery of a ground moving robot may have a high capacity and effective noise cancelling may be possible during a long time period without recharging the battery.

For example, the circuitry 120 comprises at least one camera configured to detect a person and a position/positional information of the person in relation to the noise cancelling apparatus based on an image recognition system. The position of the person is used as position of the acoustic receiver 140, e.g. if the person is not identified as the user. The detected person may be an eavesdropper and the image recognition system may recognize the shape of the person. The image recognition system may be based on pattern recognition. The image recognition system may be based on machine learning techniques and may improve during the time of use of the noise cancelling apparatus. The image recognition system may have stored an image of the user of the noise cancelling apparatus.

A user could use the noise cancelling apparatus in different operating modes and e.g. switch between a first and a second operating mode. In a first operating mode with the user as the acoustic source, only persons who are not the user are considered as acoustic receivers. In a second operation mode with the user as the acoustic receiver, the image recognition system may determine a positional information of the acoustic receiver by recognizing the user via camera using the stored image of the user, e.g. to determine a direction of the user. Further positional information could be provided by using a Time of Flight camera, e.g. to determine a distance of the user. The direction and distance can be combined to determine the position of the user.

For example, the position of the recognized person is used as position of the acoustic receiver 140 only if the person is recognized as an eavesdropper. This recognition might e. g. be done based on a distance between the position of the person and the position of the acoustic source 130. For example, if the distance is larger than a predefined threshold distance of 1 meter, 3 meters or 10 meters, then the person may be recognized as an eavesdropper, as this person is unlikely to be a conversation partner of the user (who is in this case the acoustic source). The actual threshold distance may be predetermined, or it might be dynamically adapted based on the current situation (how many people are currently close to the user, surrounding noise level etc.). If the user of the noise cancelling apparatus has a conversation with another person next to him, this person may be within the predefined distance. In this situation, it can be avoided to provide noise cancelling that would cancel the acoustic speech signal of the user at the position of a conversation partner of the user. If more than one eavesdropper is recognized, it can be possible to provide noise cancelling at the position of the eavesdropper located closest to the acoustic source. In another embodiment, additional or alternative criteria may be used for the recognition of an eavesdropper. For example, a behavior of a person detected based on input from one or more sensors of the noise cancelling device or from external sources may be considered. For example, people who are passing by the user in a normal walking speed will not be recognized as eavesdroppers, as they will only be within hearing distance for a short amount of time, while persons remaining in the vicinity of the user for a longer time might be recognized as eavesdroppers.

In some examples, the circuitry 120 comprises at least an antenna configured to detect the presence of electromagnetic communication signals, like Wifi signals, mobile communication signals or similar. The circuitry 120 is configured to determine a source of an electromagnetic signal that cannot be assigned to a user of the device as the position of the acoustic receiver 140. The electromagnetic signal could be received by at least one antenna, or two or more antennas (e.g. stereo antennas) of the circuitry. A most intensive electromagnetic signal received by one antenna could be chosen to be used for determining the acoustic receiver. For example, the source of an unknown electromagnetic communication signal may be a mobile device with a microphone which receives an acoustic signal from the user and which may be identified as the acoustic receiver. The mobile device might transmit a conversation of the user via the electromagnetic communication signal detected by the noise cancelling apparatus to an eavesdropper. The position of the source of the unknown electromagnetic signal can be used as the position of the acoustic receiver. As an effect, a privacy of the user of the noise cancelling apparatus may be further increased due to the possibility of the noise cancelling apparatus to recognize also electrical devices as potential eavesdroppers.

For example, the circuitry 120 comprises at least one microphone, and the circuitry 120 determines a position of a most intensive acoustic emission as position of the acoustic source 130. The position may be determined by using at least two microphones in a stereo arrangement or by using a stereo microphone. A pair of microphones enables e.g. measuring a phase difference between the respective microphone signals to determine a direction of the acoustic source. The acoustic source may be a loudspeaker in an environment of talking persons, wherein the sound of the loudspeaker is the loudest sound in the environment. The circuitry may determine the loudspeaker as the acoustic source by comparing sound levels of available acoustic sources and selecting the loudest acoustic source. Two acoustic sources could be distinguished by determining a direction of each acoustic source from the noise cancelling apparatus and/or by comparing the audio signals with respect to their content (e.g. separate a music signal from a speech signal). The circuitry may comprise a microphone array of at least two microphones to determine a positional information of the loudspeaker e.g. due to a phase shift of the acoustic signals received at the respective microphones of the array. The microphones may be arranged in an array, a linear structure or the like, such that they are able, for example, to determine different delay times of sound waves originating from the acoustic source and/or using beamforming techniques. A ratio between directly received sound waves and reflected (e.g. from a wall) sound waves may indicate a distance of the acoustic source from the noise cancelling apparatus.

In some examples, the circuitry of the noise cancelling apparatus may comprise a positioning module, e. g. a GPS (global positioning system) module or a geomagnetic positioning module, to determine a position of the noise cancelling apparatus. In an embodiment, additionally or alternatively, the circuitry may comprise a connection device configured to connect the noise cancelling apparatus wirelessly or in a wired manner with an electrical device of the user, e.g. a mobile phone or a wearable device (as a smartwatch) of the user. A position of the electrical device of the user may be transmitted to the noise cancelling apparatus and may be used as position of the acoustic source (or of the acoustic receiver, depending on an operating mode). The position of the electrical device of the user may be a GPS-position determined by the electrical device of the user.

In some examples, the noise cancelling apparatus 100 may further comprise an acoustic absorbing shield. An acoustic absorbing shield may be made of an acoustic absorbing material, e.g. foam material, or an acoustic reflecting material, e.g. the acoustic absorbing shield may comprise a hard and/or even surface. For example, if the target position is on a line of sight between the acoustic source and the acoustic receiver, the acoustic absorbing shield may further attenuate an acoustic signal from the acoustic source at the position of the acoustic receiver. The autonomously moving noise cancelling apparatus may continuously reposition itself to stay located on a respective line of sight also if the position of the acoustic source and/or the acoustic receiver changes.

The presented concept can be provided by having an autonomously moving noise cancelling device. The device may have the capabilities of automatically detecting the source of e.g. a confidential conversation and the location of e.g. an eavesdropper. Based on those locations the device is then able to reposition itself to an optimal position where it produces the noise cancelling signal towards the eavesdropper in order to prevent eavesdropping of the conversation.

The source of the confidential conversation can be detected by the noise cancelling device, for example, by the noise cancelling device initially registering with another device carried by the owner of the noise cancelling device. These devices then communicate with each other and exchange information about the user's position, e.g. at regular intervals or upon a movement of the user.

The position of the eavesdropper can be detected, in one embodiment, by monitoring a space around the acoustic source by means of one or more sensors being part of the noise cancelling apparatus, like a camera and/or an antenna. For example, a 360 degree video feed (e.g. provided by a device at the user and transmitted to the noise cancelling apparatus) of surroundings around the source of conversation, and recognizing people from it, for example by the use of machine learning. Optionally, all recognized people that are further away from the source of conversation than a predefined distance of for example 3 meters are treated as eavesdroppers. Optionally, entities (electronic devices) around the user that are producing electromagnetic communication signals are treated as potential eavesdroppers, as those entities, like mobile phones, may be carried or placed by eavesdroppers.

For example, a noise cancelling apparatus may provide noise cancelling at two or more positions of two or more acoustic receivers, respectively. For example, for this the noise cancelling apparatus may comprise two loudspeakers, e.g. rotatable, to output a respective countersignal respectively phase-shifted, into the directions of the two respective positions. A corresponding target position could be determined by taking all acoustic receiver positions into account.

The presented concept also supports an operation mode where the user is not protected from being overheard, but from hearing. This can be the case when e.g. a user of the noise cancelling device does not want to hear external noise.

An example of the autonomously moving noise cancelling device could be a mini helicopter buzzing around its owner. Another example could be a robot maid used in household.

Figure 2:
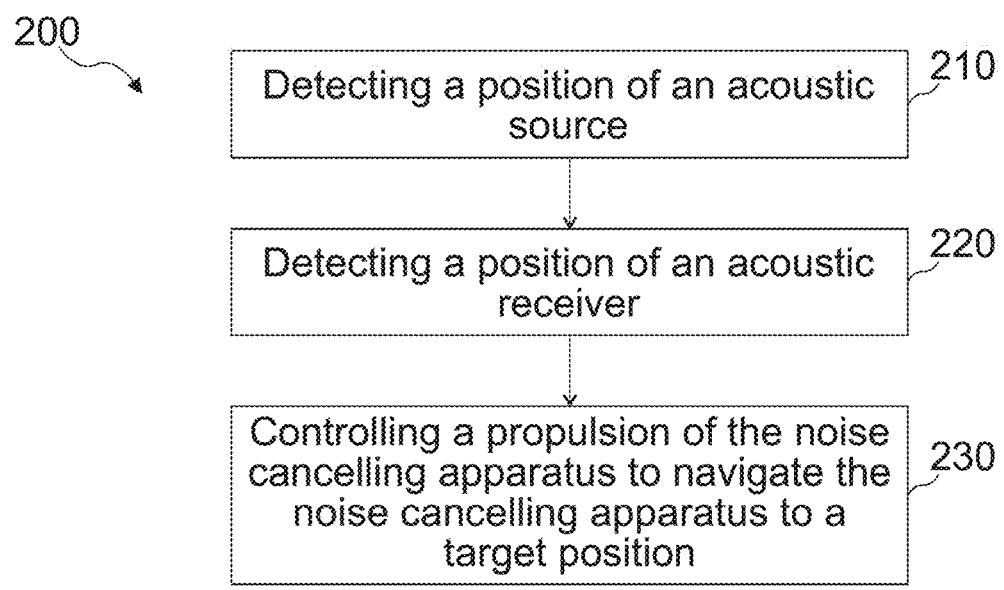
FIG. 2 shows a schematic illustration of a noise cancelling method.

FIG. 2 shows a schematic illustration of a noise cancelling method 200. The method 200 may comprise determining a position of an acoustic source 210 and comprises determining a position of an acoustic receiver 220. Depending on the determined positions of the acoustic source and the acoustic receiver, the method 200 may comprise determining a target position, e.g. between the positions of the acoustic source and the acoustic receiver. Method 200 further comprises controlling a propulsion component of the noise cancelling apparatus to navigate the noise cancelling apparatus to a target position 230 to at least partly cancel an acoustic signal from the acoustic source at the position of the acoustic receiver. By using the method, it may be possible to increase the privacy of a user. For example, a confidential conversation of the user may be protected against bugging or the user may be protected against external noise or loud sounds.

The noise cancelling method may attenuate an acoustic signal, for example speech, noise from a machine, or a signal from a loudspeaker at a position of the acoustic receiver. At least a certain degree of quietness may be provided at the position of the acoustic receiver, hence possibly improving a comfort of someone who does not want to hear the acoustic signal from the acoustic source. It may be possible as well to prevent the acoustic signal of the acoustic source to reach the position of the acoustic receiver, hence possibly improving a privacy of the acoustic source.

FIG. 3 shows an example of using a noise cancelling apparatus 302 for noise cancelling of an acoustic signal 304 from an acoustic source 306 at a respective position of a moving acoustic receiver 308.

Figure 3A:
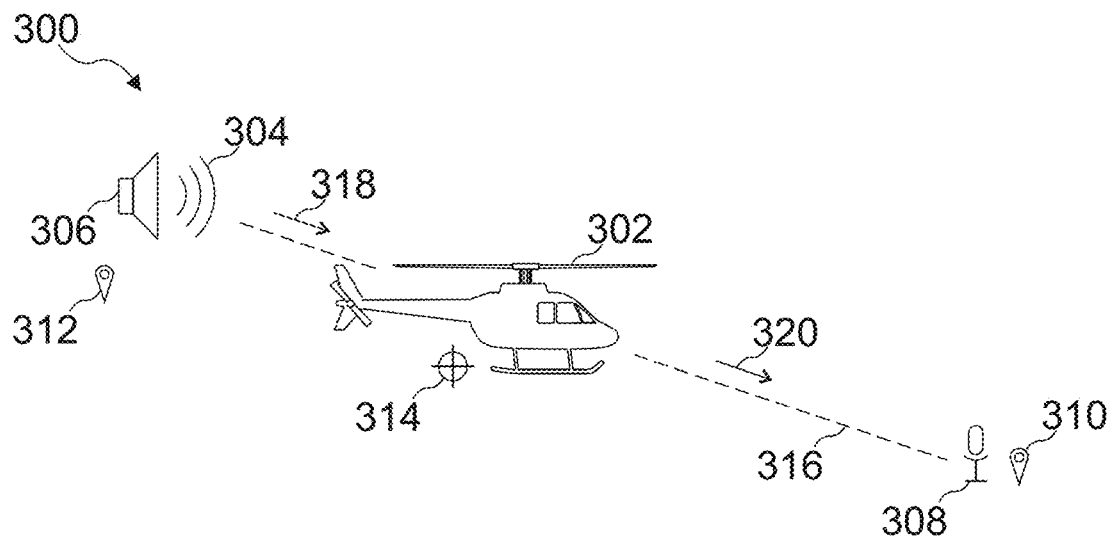
FIG. 3 shows an example of using a noise cancelling apparatus for noise cancelling of an acoustic signal from an acoustic source at a respective position of a moving acoustic receiver.

In a first example 300, shown in FIG. 3a, the acoustic receiver 308 is located at a first receiver position 310. The acoustic source 306 is located at a first source position 312. The noise cancelling apparatus 302 recognizes the acoustic receiver 308 e.g. by means of image recognition. The first receiver position may be five meters away from the first source position. The noise cancelling apparatus 302 may be a mini helicopter with propellers for autonomously moving the mini helicopter in the air. A circuitry 120 of the mini helicopter determines a first target position 314, and the mini helicopter flies to the first target position. The first target position may be on a line of sight 316 between the acoustic source and the acoustic receiver. A microphone of the mini helicopter may receive an acoustic signal 318 from the acoustic source which corresponds, or is at least correlated, to the acoustic signal 304. The circuitry generates a countersignal 320, which is calculated to cancel the acoustic signal 304 at the first receiver position 310 and may be the acoustic signal 318 phase-shifted by about 180°. According to an embodiment, enhanced noise cancelling methods or other known noise cancelling methods may be used. The circuitry may output the countersignal via a loudspeaker of the mini helicopter into the direction of the first receiver position 310. As a consequence, the acoustic signal 318 and the countersignal 320 may superimpose at the first receiver position 310 in a way that the acoustic signal 304 is not perceptible at the first receiver position 310 or is canceled.

Figure 3B:
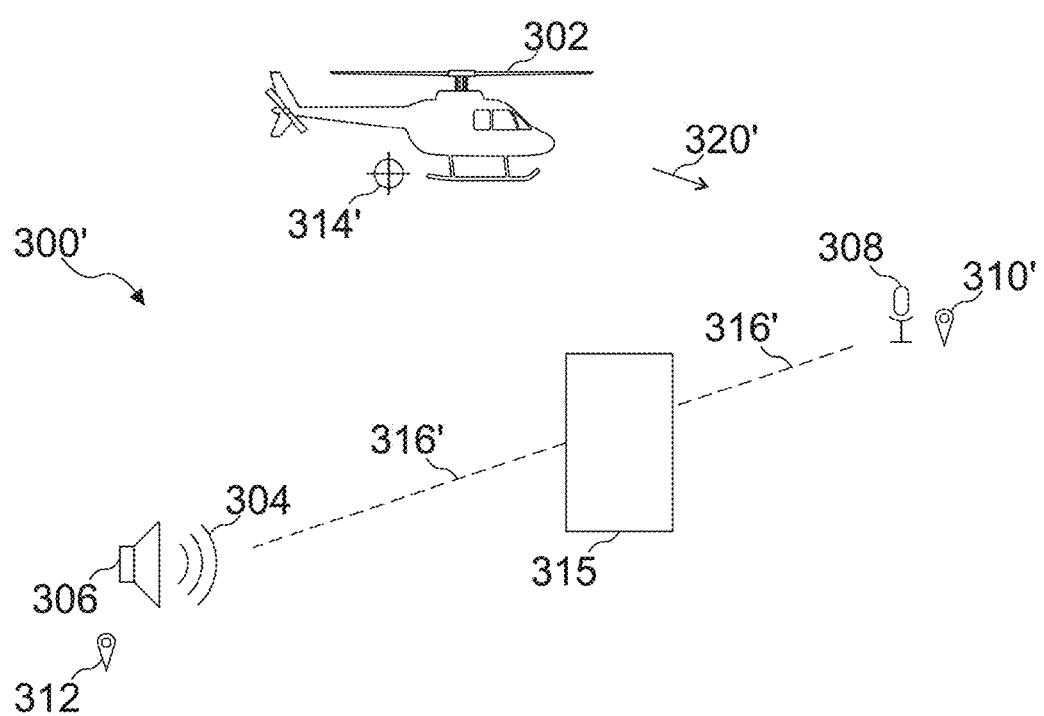

In a second example 310', shown in FIG. 3b, the acoustic receiver 308 moves to a second receiver position 310' and the acoustic source remains at the first source position 312. The circuitry recognizes the changed receiver position and calculates a new target position 314', e.g. the acoustic source is constantly monitored by the circuitry of the noise cancelling apparatus. In the second example, the new target position 314' is outside a line of sight 316' between the acoustic source and the acoustic receiver, e.g. because an object or obstacle 315 on the line of sight 316' might hinder the mini helicopter from flying to the line of sight 316'. The mini helicopter may not receive the acoustic signal 304 from the acoustic source, e.g. an obstacle may be located between the acoustic source and a microphone of the mini helicopter. As a consequence, the circuitry may generate a second countersignal 320' uncorrelated to the acoustic signal 304. The countersignal 320' may be an arbitrary song and outputted via a loudspeaker. The acoustic receiver 308 at the second receiver position 310' may only hear the loud song that covers acoustically the acoustic signal 304 so that it is not perceptible at the second receiver position 310' due to the noise cancelling of the noise cancelling apparatus 302. It becomes obvious that "noise cancelling" as understood herein may comprise rendering unintelligible, or masking, a first acoustic signal, e.g. a speech signal of a user communication, at a receiver position, which may involve that the overall sound level at the receiver position is increased. In other examples, noise cancelling may comprise reducing a sound level at the receiver position.

The following examples pertain to further embodiments.
(1) A noise cancelling apparatus, comprising: a propulsion component configured to autonomously move the noise cancelling apparatus; and circuitry configured to determine or detect a position of an acoustic source; determine or detect a position of an acoustic receiver; depending on the determined positions of the acoustic source and the acoustic receiver, control the propulsion component to navigate the noise cancelling apparatus to a target position to at least partly cancel an acoustic signal from the acoustic source at the position of the acoustic receiver.
(2) The noise cancelling apparatus according (1), wherein the circuitry is further configured to generate an acoustic countersignal at the target position, the acoustic countersignal at least partly canceling the acoustic signal from the acoustic source at the position of the acoustic receiver.
(3) The noise cancelling apparatus according to (2), wherein the countersignal is generated with respect to the position of the acoustic source, the position of the acoustic receiver, and the position of the noise cancelling apparatus.
(4) The noise cancelling apparatus according to (1) to (3), wherein the noise cancelling apparatus provides two operating modes, wherein in a first operating mode a user of the noise cancelling apparatus is the acoustic source, and wherein in a second operating mode a user of the noise cancelling apparatus is the acoustic receiver
(5) The noise cancelling apparatus according to (4), wherein in the second operating mode the countersignal is an arbitrary signal masking acoustic signal from source at the position of the acoustic receiver.
(6) The noise cancelling apparatus according to (1) to (5), wherein a positional information is determined based on detecting the acoustic source and/or the acoustic receiver by using one or more sensors which are part of the noise cancelling apparatus.
(7) The noise cancelling apparatus according to (1) to (6), wherein the target position is between the position of the acoustic source and the position of the acoustic receiver.
(8) The noise cancelling apparatus according to one of (1) to (7), wherein the target position is on a line of sight between the acoustic source and the acoustic receiver.
(9) The noise cancelling apparatus according to one of (1) to (8), wherein the target position is adapted dynamically to movements of the acoustic source and/or the acoustic receiver.
(10) The noise cancelling apparatus according to (1) to (9), wherein the target position is within a radius smaller than 3 m around the position of the acoustic receiver.
(11) The noise cancelling apparatus according to (1) to (10), wherein a distance between the target position and the position of the acoustic source is larger than a distance between the position of the acoustic source and the position of the acoustic receiver, wherein a distance between the target position and the position of the acoustic receiver is smaller than a distance between the position of the acoustic source and the position of the acoustic receiver, and wherein the noise cancelling apparatus is configured to receive an electromagnetic signal comprising an information about the acoustic signal from the acoustic source.
(12) The noise cancelling apparatus according to (1) to (11), wherein the target position is determined based on at least one obstacle in an environment of the noise cancelling apparatus detected by one or more sensors of the noise cancelling apparatus
(13) The noise cancelling apparatus according to one of (1) to (12), wherein the propulsion component comprises a propeller of a drone configured to move the noise cancelling apparatus in three orthogonal dimensions.
(14) The noise cancelling apparatus according to one of (1) to (13), wherein the propulsion component is a movement device of a robot.
(15) The noise cancelling apparatus according to one of (1) to (14), wherein the circuitry comprises at least one camera and is configured to detect a person based on an image recognition system, wherein a position of the person is used as position of the acoustic receiver or of the acoustic source, depending on an operating mode.
(16) The noise cancelling apparatus according to (15), wherein the position is used as the position of the acoustic receiver based on distance from the user to position and/or based on a behavior of the person and/or or considering user input.
(17) The noise cancelling apparatus according to (15), wherein the position of the person is used as position of the acoustic receiver if a distance between the position of the person and the position of the acoustic source is larger than 3 meters.
(18) The noise cancelling apparatus according to (1) to (17), wherein a position of a user of the noise cancelling apparatus is determined by a mobile or wearable device carried by the user and an information about the position is transmitted to the noise cancelling apparatus
(19) The noise cancelling apparatus according to (15) to (18), wherein the image recognition system is based on a machine learning process.
(20) The noise cancelling apparatus according to one of (1) to (19), wherein the circuitry comprises at least an antenna configured to detect electromagnetic signals, wherein the circuitry is configured to determine a source of an unknown electromagnetic signal as position of the acoustic receiver.
(21) The noise cancelling apparatus according to one of (1) to (20), wherein the circuitry comprises at least one microphone and the speaker detection device determines a position of a most intensive acoustic emission as position of the acoustic source.
(22) The noise cancelling apparatus according to one of (1) to (21), wherein the speaker detection device comprises a connection device configured to connect the noise cancelling apparatus with an electrical device of a user, wherein a position of the electrical device of the user is used as position of the acoustic source.
(23) The noise cancelling apparatus according to one of (1) to (22), wherein the noise cancelling device comprises a microphone and a loudspeaker, wherein the noise cancelling device is configured to generate a countersignal of an acoustic signal received by the microphone, wherein the noise cancelling device is configured to output the countersignal via the loudspeaker to attenuate the received acoustic signal at least at the position of the acoustic receiver due to the effect of destructive interference.
(24) The noise cancelling apparatus according to (23), wherein the countersignal is generated with respect to the position of the acoustic source, the position of the acoustic receiver, and the position of the noise cancelling apparatus.
(25) The noise cancelling apparatus according to one of (1) to (24), further comprising an acoustic absorbing shield.
(26) The noise cancelling apparatus according to one of (1) to (25), wherein the noise cancelling apparatus is a mobile noise cancelling apparatus comprising at least a motor of the self-positioning device and a battery.
(27) The noise cancelling apparatus according to one of (1) to (26), wherein the acoustic source is one of a loudspeaker, a sound emitting machine, and a talking person.
(28) A noise cancelling method. The method comprises detecting a position of an acoustic source; determining a position of an acoustic receiver; depending on the determined positions of the acoustic source and the acoustic receiver, navigating an moving noise cancelling device to a target position; and generating an acoustic countersignal at the target position, the acoustic countersignal at least partly canceling or covering an acoustic signal from the acoustic source at the position of the acoustic receiver.

Other concepts regarding noise cancelling describe technologies where noise cancelling signal producing devices are either positioned stationary around some room for example, or attached very close to the source of confidential conversion, for example inside a mobile phone. These possible shortcomings possibly arising by using other concepts may have the undesired effect of making it impossible for the noise cancelling devices from preventing eavesdropping of the confidential conversation as devices may not always be positioned optimally in order to fulfill their function. The presented noise cancelling apparatus may overcome these shortcomings.

An aspect of the presented concepts is preventing eavesdroppers from hearing content of confidential conversations.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for pedagogical purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a signal", "means for generating a signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A noise cancelling apparatus, comprising:
   a propulsion component configured to move the noise cancelling apparatus; and circuitry configured to
   determine a position of an acoustic receiver;
   depending on the determined position of the acoustic receiver, control the propulsion component to navigate the noise cancelling apparatus to a target position to at least partly cancel an acoustic signal from an acoustic source at the position of the acoustic receiver.

2. The noise cancelling apparatus according to claim 1, wherein the circuitry is further configured to
   generate an acoustic countersignal at the target position, the acoustic countersignal at least partly canceling the acoustic signal from the acoustic source due to interference at the position of the acoustic receiver.

3. The noise cancelling apparatus according to claim 2, wherein the circuitry is configured to generate the countersignal with respect to the position of the acoustic source, the position of the acoustic receiver, and the position of the noise cancelling apparatus.

4. The noise cancelling apparatus according to claim 1, wherein the noise cancelling apparatus provides two operating modes, wherein in a first operating mode a user of the noise cancelling apparatus is the acoustic source, and wherein in a second operating mode a user of the noise cancelling apparatus is the acoustic receiver.

5. The noise cancelling apparatus according to claim 1, wherein the circuitry is configured to emit an arbitrary signal as a countersignal masking the acoustic signal from the acoustic source at the position of the acoustic receiver.

6. The noise cancelling apparatus according to claim 1, wherein the target position is one of a position between the position of the acoustic source and the position of the acoustic receiver, and a position on a line of sight between the position of the acoustic source and the position of the acoustic receiver.

7. The noise cancelling apparatus according to claim 1, wherein the circuitry is configured to determine the target position based on environmental information about an environment of the noise cancelling apparatus detected by one or more sensors of the noise cancelling apparatus.

8. The noise cancelling apparatus according to claim 1, wherein the noise cancelling apparatus is part of a drone, wherein the propulsion component comprises a propeller of the drone configured to move the noise cancelling apparatus in three orthogonal dimensions, or part of a robot, wherein the propulsion component comprises a movement device of the robot.

9. The noise cancelling apparatus according to claim 1, wherein the circuitry is configured to determine the position of a user of the noise cancelling apparatus as the position of the acoustic receiver or as a position of the acoustic source based on an position information signal received from a mobile or wearable device carried by the user.

10. The noise cancelling apparatus according to claim 1, wherein the circuitry comprises at least one camera and is configured to detect at least one person based on an image recognition system, wherein a position of the at least one person is used as the position of the acoustic receiver or the acoustic source.

11. The noise cancelling apparatus according to claim 10, wherein the circuitry is configured to determine the position of the person as position of the acoustic receiver based on a distance between the position of the person and the position of the acoustic source and/or based on a behavior of the person, wherein the distance and behavior are detected using one or more sensors of the noise cancelling apparatus.

12. The noise cancelling apparatus according to claim 1, wherein the circuitry comprises at least an antenna configured to detect electromagnetic signals, wherein the circuitry is configured to determine a source of an electromagnetic signal not assigned to an electrical device of a user of the noise cancelling apparatus as the position of the acoustic receiver.

13. The noise cancelling apparatus according to claim 1, further comprising determining the position of the acoustic source.

14. The noise cancelling apparatus according to claim 13, wherein the circuitry comprises at least one microphone and the circuitry determines a position of a most intensive acoustic emission as the position of the acoustic source.

15. The electronic device of claim 1, wherein
the circuitry comprises at least one camera and is configured to detect at least one person based on an image recognition system.

16. The electronic device of claim 15, wherein a position of the at least one person is used as the position of the acoustic receiver or the acoustic source.

17. A noise cancelling method performed by a noise cancelling apparatus, the method comprising:
   determine a position of an acoustic receiver;
   depending on the determined position of the acoustic receiver, controlling a propulsion component of the noise cancelling apparatus to navigate the noise cancelling apparatus to a target position to at least partly cancel an acoustic signal from an acoustic source at the position of the acoustic receiver.

18. An electronic device, comprising:
   circuitry configured to
      determine a position of an acoustic receiver; and
      depending on the determined position of the acoustic receiver, control a propulsion components of the electronic device to navigate the electronic device to a position to at least partially cancel an acoustic signal from an acoustic source at the position of the acoustic receiver.

19. The electronic device of claim 18, wherein electronic device is:
   part of a drone and the propulsion component comprises a propeller of the drone configured to move the electronic device in three orthogonal dimensions; or
   part of a robot and the propulsion component comprises a movement device of the robot.

20. The electronic device of claim 18, wherein the circuitry is configured to determine a position of a user of the electronic device as the position of the acoustic receiver or as a position of the acoustic source based on a position information signal received from a mobile or wearable device carried by the user.

* * * * *